April 18, 1967 D. J. VAN DORN 3,314,132

METHOD OF MAKING A ROTARY SWITCH

Filed Oct. 12, 1962

United States Patent Office 3,314,132

Patented Apr. 18, 1967

3,314,132

METHOD OF MAKING A ROTARY SWITCH

David J. Van Dorn, Pompton Plains, N.J., assignor to Collectron Corporation, New York, N.Y., a corporation of New York Filed Oct. 12, 1962, Ser. No. 230,087

1 Claim. (Cl. 29—155.54)

This invention relates generally to the field of rotary switches, and more particularly to an improved precision rotary switch suitable for producing high frequency electrical pulsation.

In many electronic applications, it is often necessary or desirable to provide a source of minute pulsing currents of variable frequency. Owing to the nature of such pulsing currents, they are best provided by switches including rotor and stator components driven at relatively high speeds, rather than by other means. Such switches are frequently employed in military applications, and the principal difficulty in fabricating suitable switches of this type has been the provision of a relatively small switch having high mechanical strength, durability and reliability. Normal requirements call for a switch capable of operating at approximately 3600 revolutions per minute, and with a useful life of at least ten million revolutions. In the absence of weight and space limitations, such switches are not difficult to design, but the usual requirements also include a minimum of weight and volume as well.

It is among the principal objects of the present invention to provide an improved rotary-type switch capable of relatively long periods of continuous operation with an unusually high reliability factor.

Another object of the invention lies in the provision of an improved rotary switch of the class described in which the effective weight and volume thereof have been reduced to a minimum, without sacrifice of long life and reliability.

Still another object of the present invention lies in the provision of an improved method for fabricating a rotary switch possessed of the above advantages.

A feature of the invention lies in the ease of assembly of the same, and subsequent disassembly for servicing.

These objects and features, as well as other incidental ends and advantages, will more fully appear in the progress of the following disclosure, and be pointed out in the appended claim.

In the drawings, to which reference will be made in the specification, similar reference characters have been employed to designate corresponding parts throughout the several views.

Figure 1:
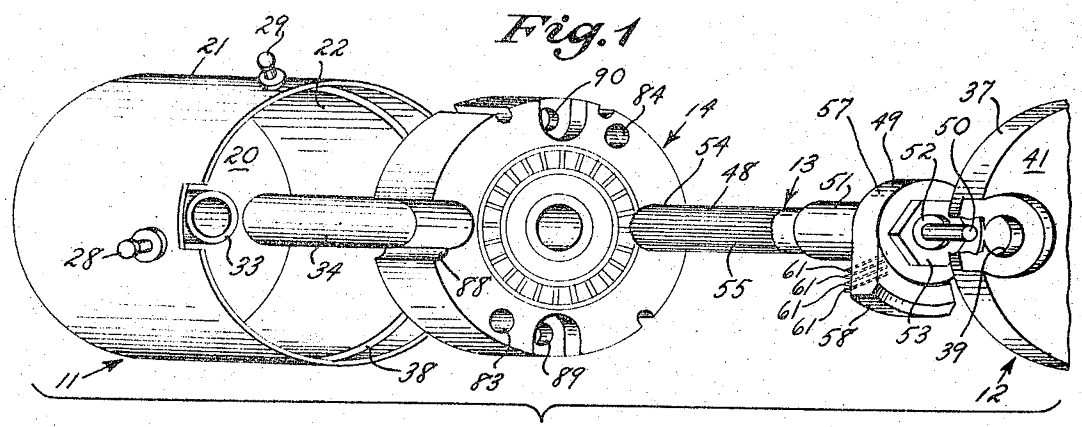
FIGURE 1 is an exploded view in perspective of an embodiment of the invention.

In accordance with the invention, the device, generally indicated by reference character 10, comprises broadly: an outer casing element 11, a cap element 12, a rotor element 13, and a stator element 14.

The outer casing element 11 may be of any suitable configuration, and is preferably machined from metal. As best seen in FIGURE 1, it includes an end wall 20, and a cylindrical wall 21 forming a large recess 22 housing the other elements. The end wall 20 is provided with a boss 23 forming a small recess 24 for the accommodation of a ball bearing 25 retained in position by a snap ring 26. First, second and third terminals 27, 28 and 29 provide for electrical connection to three individual circuits (not shown), all such circuits also being connected to a grounding terminal 30 which serves as a common return. Peripheral openings 31 and 32 communicate with tubular members 33 and 34, respectively, to provide means for screw mounting of the device 10 upon a flat surface (not shown).

The cap element 12 serves to close the casing element 11, and includes a peripheral surface 37 fitting within a rabbet 38 in the cylindrical wall 21. Through openings 39 and 40 communicate with the tubular members 33 and 34, respectively, when the device is in assembled condition. The cap element 12 also includes an outer surface 41 and an inner surface 42 from which extends a circular recess 43 accommodating a ball bearing 44 axially aligned with the bearing 25 to support the rotor element 13 therebetween.

The rotor element 13 includes a shaft member 48 and a rotor member 49 mounted thereupon. The shaft member 48 includes a first end 50 positionable within the ball bearing 44 for rotation therewith, and a cylindrical surface 51, the end of which provides locating means with respect to the bearing 25. A threaded area 52 supports the rotor member 49, which is maintained in position by a nut 53. A second end 54 extends outwardly of the outer casing element 11, and is provided with gear teeth 55 connectable to driving means (not shown).

The rotor member 49 is preferably formed from synthetic resinous material, and includes a circular mounting portion 57 which is positionable upon the area 52, and an arm portion 58 having a plurality of electrically interconnected brushes 61.

The stator element 14 includes an integrated segment ring 64 (a part of which is machined away during the process of manufacture), which forms a continuous ring member 65 and a segmented ring member 66. The ring 66 includes a plurality of individual segments 67, which, in number, are a multiple of the number of circuit terminals 27–29, to which they are connected by first, second and third conductors 68, 69, and 70, respectively. A grounding conductor 71 interconnects the continuous ring member 65 with the grounding terminal 30.

Figures 2, 3, 4, 5, 6, 7, 8, 9, 10, 11:
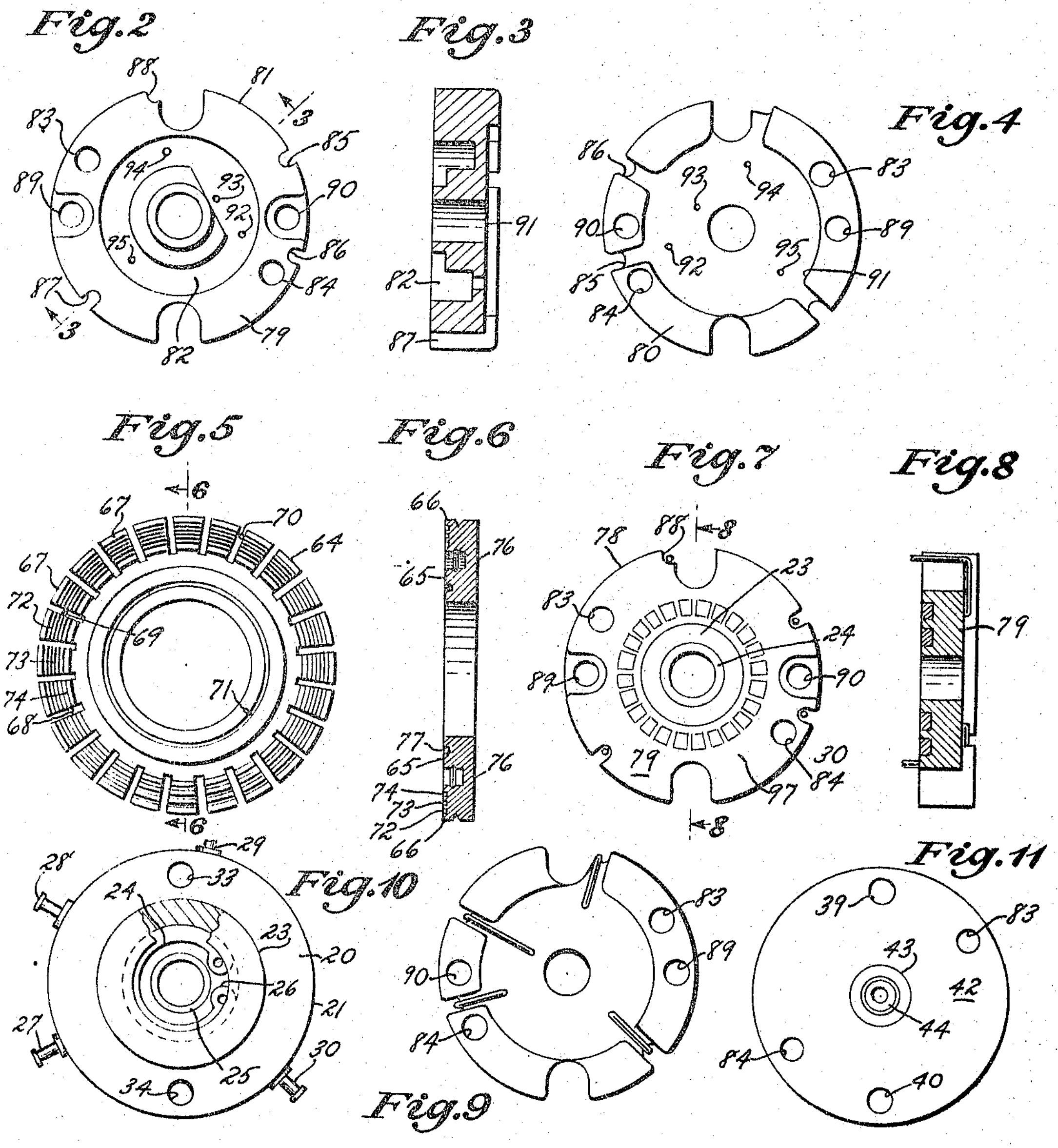
FIGURE 2 is an end elevational view of a commutator body comprising a part of the embodiment.
FIGURE 3 is a longitudinal sectional view as seen from the plane 3—3 in FIGURE 2.
FIGURE 4 is a view in elevation of the commutator body showing the side opposite that seen in FIGURE 2.
FIGURE 5 is a view in elevation showing a partly assembled integrated body including certain electrically conductive rings forming a part of the embodiment.
FIGURE 6 is a longitudinal sectional view as seen from the plane 6—6 of FIGURE 5.
FIGURE 7 is an end elevational view showing an integrated commutator assembly.
FIGURE 8 is a longitudinal sectional view as seen from the plane 8—8 in FIGURE 7.
FIGURE 9 is a view in elevation showing the side opposite that seen in FIGURE 7.
FIGURE 10 is an end elevational view, partly broken away to show detail.
FIGURE 11 is a view in elevation showing the inner surface of the cap element which comprises a part of the embodiment.

Referring to FIGURES 5 and 6, the segmented ring 66 is provided with first, second and third grooves 72, 73 and 74, respectively, in which the conductors 70, 69 and 68, respectively, are disposed. The conductors 68–70 are insulated substantially over their entire length, but are provided with uninsulated portions corresponding to the distance between every third individual segment 67, so that the electrical continuity is established with every third segment to one given circuit terminal. In the disclosed embodiment, there are four times as many segments 67 as contact terminals, but it will be understood by those skilled in the art that this is merely a matter of choice, and any given multiple of the number of circuit terminals may also be provided, depending upon the frequency of pulses required and the speed of rotation of the rotor element 13 during operation.

The continuous ring member 65 is provided with a single groove 77 providing means for attaching the grounding conductor 71. As seen in FIGURE 6, prior to completion of manufacture, the continuous ring member 65 and segmented ring member 66 are interconnected by a web 76.

The stator element 14 also includes a commutator body of generally irregular configuration, as best seen in FIGURES 2, 3 and 4. The body 78 is bounded by an outer surface 79, an inner surface 80, and a peripheral surface 81. Extending inwardly from the outer surface 79 is an annular groove 82 of stepped cross section. Mounting holes 83 and 84 extend between the surfaces 79 and 80, and provide means for the screw mounting of the commutator body to the casing element 11. Extending longitudinally along the peripheral surface 81 are grooves 85, 86, 87 and 88 through which the conductors 68–71 pass, as are channels 89 and 90 for the accommodation of the tubular members 33 and 34, respectively. An annular recess 91 leads to the grooves 85–88 for accommodation of the conductors 68–71, inclusive. Small holes 92, 93, 94 and 95 communicate with the lower portion of the groove 82 to provide continuity with the recess 91 (see FIGURE 9).

The stator element 14 is assembled by wiring the integrated ring 64 as described hereinabove, following which the conductors 68–71 are threaded through the holes 92–95. Following this, the ring 64 is placed within the groove 82, and a sufficient amount of curable synthetic resinous material 97 is thereafter injected. The resin is then cured, and, after hardening, the web 76 is machined away to form the individual rings 65 and 66. This operation may also place a finished surface upon the commutator body 78 at 79, following which the stator element 14 may then be interconnected with the casing element 11, the rotor element 13 positioned, and the cap element 12 closed to fully integrate the device 10. After the machine operation, the stator element 14 assumes the appearance shown in FIGURE 7, wherein the rings 65 and 66 are flush with the outer surface 79, and thus are not only fully anchored but shielded from damage.

I wish it to be understood that I do not consider the invention limited to the precise details of structure shown and set forth in this specification, for obvious modifications will occur to those skilled in the art to which the invention pertains.

I claim:

The method of manufacturing a rotary switch including a commutator body having a continuous conductive ring and a segmented conductor ring disposed in coaxial radially-spaced relation thereto, which includes the steps of:

(a) providing a commutator body having an annular groove therein;

(b) forming said continuous and segmented rings as portions of an integral body having a pair of coaxially positioned laterally-extending flanges interconnected by a web of material;

(c) wiring said continuous and segmented rings;

(d) positioning said integral body within said groove;

(e) injecting a quantity of moldable synthetic resin into the interstices between said integral body and said groove, and curing said resin to mount said integral body within said commutator body; and (f) cutting away said web to expose parallel surfaces of said continuous and segmented rings.

References Cited by the Examiner

UNITED STATES PATENTS

| | | | |
|---|---|---|---|
| 2,316,652 | 4/1943 | Moeller | 29—155.54 |
| 2,455,864 | 12/1948 | Hanna | 29—155.54 |
| 2,674,784 | 4/1954 | Roberts et al. | 29—155.54 |
| 2,915,658 | 12/1959 | Arnold | 29—155.54 XR |
| 3,022,389 | 2/1962 | Wolrab | 200—24 |
| 3,035,128 | 5/1962 | Maynard | 200—24 |
| 3,079,520 | 2/1963 | Schafer | 29—155.54 XR |

JOHN F. CAMPBELL, *Primary Examiner.*

BERNARD A. GILHEANY, ROBERT K. SCHAEFER, *Examiners.*

S. B. SMITH, *Assistant Examiner.*